United States Patent
Qiu et al.

(10) Patent No.: US 11,685,858 B2
(45) Date of Patent: Jun. 27, 2023

(54) METHODS FOR MAKING AND USING RETARDED ACID COMPOSITIONS FOR WELL STIMULATION

(71) Applicant: SCHLUMBERGER TECHNOLOGY CORPORATION, Sugar Land, TX (US)

(72) Inventors: Xiangdong Qiu, Al-Khobar (SA); Dominic Joseph Brady, Al-Khobar (SA); Ziad Al-Jalal, Oklahoma City, OK (US); Mohan Kanaka Raju Panga, Sugar Land, TX (US); Christopher Daeffler, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/331,252

(22) Filed: May 26, 2021

(65) Prior Publication Data

US 2021/0277302 A1   Sep. 9, 2021

Related U.S. Application Data

(63) Continuation of application No. 15/469,861, filed on Mar. 27, 2017, now abandoned.

(51) Int. Cl.
*C09K 8/72* (2006.01)
*C09K 8/82* (2006.01)

(52) U.S. Cl.
CPC .............. *C09K 8/725* (2013.01); *C09K 8/72* (2013.01); *C09K 8/82* (2013.01); *C09K 2208/32* (2013.01)

(58) Field of Classification Search
CPC . C09K 8/725; C09K 8/72; C09K 8/74; C09K 8/602
See application file for complete search history.

(56) References Cited

U.S. PATENT DOCUMENTS

| 4,702,848 A | 10/1987 | Payne |
| 5,327,973 A | 7/1994 | Jennings, Jr. |

(Continued)

FOREIGN PATENT DOCUMENTS

| WO | 2016164056 A1 | 10/2016 |
| WO | 2017040434 A1 | 3/2017 |
| WO | 2017040553 A1 | 3/2017 |
| WO | 2017040562 A1 | 3/2017 |

OTHER PUBLICATIONS

Buijse, "Understanding wormholing mechanisms can improve acid treatments in carbonate formations", SPE Production Facilities, vol. 15, No. 3, 2000, pp. 168-175.

(Continued)

*Primary Examiner* — Aiqun Li
(74) *Attorney, Agent, or Firm* — Rushi C. Sukhavasi

(57) ABSTRACT

Described herein are methods for treating a subterranean formation penetrated by a wellbore with a retarded acidizing fluid containing an acid and an acid retarding agent, the concentrations of which are adjusted based on measured parameter values of the formation. Also described is a method for treating a subterranean formation by introducing an acid to the formation following the introduction of an acid retarding agent to the formation. Also described is a method for acid fracturing a subterranean formation including reducing the concentration of an acid retarding agent contained in a retarded acidizing fluid over the course of the acid fracturing operation.

19 Claims, 7 Drawing Sheets

(56) References Cited

U.S. PATENT DOCUMENTS

| | | | |
|---|---|---|---|
| 6,196,318 B1 | 3/2001 | Gong et al. | |
| 7,237,608 B2 | 7/2007 | Fu et al. | |
| 2004/0129418 A1* | 7/2004 | Jee .................. | G16B 40/00 |
| | | | 374/E11.015 |
| 2008/0139412 A1 | 6/2008 | Fuller | |
| 2008/0289828 A1 | 6/2008 | Hutchins | |
| 2013/0025870 A1 | 1/2013 | Berry et al. | |
| 2013/0032345 A1* | 2/2013 | Freese ................ | G01N 21/85 |
| | | | 166/279 |
| 2014/0212006 A1 | 7/2014 | Zhao et al. | |
| 2015/0114647 A1 | 4/2015 | Jiang et al. | |
| 2016/0146964 A1 | 5/2016 | Badri et al. | |
| 2016/0298024 A1 | 10/2016 | Panga et al. | |

OTHER PUBLICATIONS

Fredd et al., "Influence of transport and reaction on wormhole formation in carbonate porous media", AIChE Journal, vol. 44, No. 9, Sep. 1998, pp. 1933-1949.

Liu et al., "Wormhole propagation behavior under reservoir condition in carbonate acidizing", Transport in porous Media, vol. 96, Issue 1, Jan. 2013, pp. 203-220.

Ghommem et al., "Carbonate Acidizing: Modeling, Analysis, and Characterization of Wormhole Formation and Propagation", Journal of Petroleum Science and Engineering, vol. 131, Jul. 2015, pp. 18-33.

International Search Report and Written Opinion issued in International Patent Appl. No. PCT/US2018/024439 dated Jul. 12, 2018; 14 pages.

Petrov et al., "An Integrated approach to the treatment of the bottom-hole zone of the formation as a method for intensification of production", Scientific and technical journal Georesources, No. 1,(33), 2010, pp. 7-10.

Office Action issued in Saudi Arabian Patent Appl. No. 2019/0788.1 dated Nov. 2, 2020; 15 pages (with English translation).

International Preliminary Reporton Patentability issued in International Patent Application No. PCT/US2018/024439 dated Oct. 10, 2019; 11 pages.

Substantive Exam issued in Saudi Arabian Patent Application No. 519410203 dated May 24, 2022, 10 pages with English translation.

\* cited by examiner

METHODS FOR MAKING AND USING RETARDED ACID COMPOSITIONS FOR WELL STIMULATION

CROSS-REFERENCE TO RELATED APPLICATIONS

This application is a continuation of co-pending U.S. patent application Ser. No. 15/469,891 filed 27 Mar. 2017, which is herein incorporated by reference.

FIELD

The disclosure relates to preparing retarded acid compositions and the use thereof in well treatment and stimulation.

BACKGROUND

This section provides background information to facilitate a better understanding of the various aspects of the disclosure. It should be understood that the statements in this section of this document are to be read in this light, and not as admissions of prior art.

When looking to enhance productivity from conventional carbonate reservoirs or improve injectivity within a water injector well/producer, matrix acidizing constitutes a commonly-used stimulation technique. This operation involves pumping acidic systems into the wellbore to dissolve the formation damage and create conductive pathways (usually referred as to wormholes) extending several inches to several feet from the borehole. A successful matrix treatment aims to produce a network of thin, but deep wormholes with a minimal amount of injected acid. This system can also be used for sandstone formations to clean cement from perforations and near wellbore restrictions to improve injectivity.

Matrix stimulation treatments are intended to create a network of dominant wormholes, characterized by a uniform network of highly-conductive flow paths, with high penetration for minimal acid volume and time on site. Dominant wormholes typically form within a range of injection rates, and this injection rate is dependent on the reactivity of the acid system. Face dissolution tends to occur where either or both the acid injectivity is low or reaction rates are high (which is more likely to occur in high temperature reservoirs). This can cause local caving and lead to intervention difficulties. At the other end of the range (with either or both of high acid injectivity or low reaction rates) one experiences uniform dissolution, leading again to wellbore enlargement, inefficient use of acid and extended time on site. Another challenge faced in acidizing operations is non-uniform acid coverage over the well length resulting from the formation heterogeneity and leading to inadequate treatment of less permeable and damaged zones.

Acid systems fall into several broad categories:
Mineral Acids

Typically hydrochloric acid (HCl) is employed for low temperature operations. This fluid has a low viscosity making it easy to pump up to high rates if needed, and is also low cost. However its reactivity is high so utilization in higher temperature wellbores leads to an inefficient stimulation job, with high acid consumption for the resultant productivity increase. In practice as the temperature increases this acid is often replaced with one with a slower reaction rate.
Organic Acids or Chelants Organic systems can be employed where a lower reaction rate compared to HCl is desired, usually because the wellbore temperature is high. However these systems have low dissolution capacity leading to potential environmental impacts and much higher costs than HCl systems. For these reasons, such systems have limited usage in the industry. These systems also have the same drawback as HCl systems in that the reactivity of these systems have a fixed relationship with acid concentration.
Emulsified Acids Acid-in-oil emulsions are often used in the industry as retarded acid systems for high temperature operations, wherein the acid is encapsulated inside an oil phase to present a physical barrier between the acid and the rock of the formation, thereby retarding the rate of acid reactivity. This allows the use of these fluids at high temperatures. However these fluids have a very binary retardation, that is, they are either emulsions or not. As a result, emulsions such as these become sub-optimal stimulation fluids outside of the preferred operating temperature range. As a dual-phase fluid they have high viscosity and high friction pressure which can limit the ability to reach the optimum injection rate, especially in longer intervals. They require substantial mixing and operational time on-location to mix, and have a very limited lifetime before the emulsion breaks, which renders the fluids unusable as the emulsion cannot be re-formed.

It can be seen that each of the acid stimulation fluids have drawbacks with regard to their ability to adapt to differing temperatures, mineralogy, and wellbore length while maintaining high dissolution capacity and minimizing time on-location.

Thus, there is a need in the industry for an acid fluid system and method of use by which these challenges can be overcome to provide for acid well stimulation which is optimized by allowing the opportunity to design the acid retardation to match the well environment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, methods are provided for treating a subterranean formation penetrated by a wellbore, the methods including: measuring at least one parameter of the subterranean formation resulting in at least one parameter value; forming a retarded acidizing fluid including an acid, and an acid retarding agent (RA) including at least one salt compound, by adjusting the concentrations of the acid and RA based on the at least one parameter value; and contacting the subterranean formation with the retarded acidizing fluid at a pressure less than the fracture initiation pressure of the subterranean formation to treat the subterranean formation. In another aspect, the retarded acidizing fluid can further include a surfactant.

In another aspect of the disclosure, methods are provided for treating a subterranean formation penetrated by a wellbore, the methods including: introducing a first composition including an acid retarding agent (RA) to the subterranean formation at a pressure less than the fracture initiation pressure of the subterranean formation; and following introduction of the first composition, introducing a second composition including an acid composition to the subterranean formation at a pressure less than the fracture initiation pressure of the subterranean formation to treat the formation. In another aspect, the first composition can further include a surfactant.

In another aspect of the disclosure, methods are provided for treating a subterranean formation penetrated by a wellbore, the methods including: utilizing a retarded acidizing fluid including an acid, a surfactant, and an acid retarding agent (RA) including at least one salt compound; contacting the formation with the retarded acidizing fluid over a period of time at a pressure higher than the fracture initiation pressure of the subterranean formation to fracture and treat the formation; and reducing the concentration of the RA relative to the acid in the retarded acidizing fluid during the period of time from an initial RA concentration to a final RA concentration lower than the initial RA concentration.

BRIEF DESCRIPTION OF THE DRAWINGS

Certain embodiments of the disclosure will hereafter be described with reference to the accompanying drawings. It should be understood, however, that the accompanying figures illustrate the various implementations described herein and are not meant to limit the scope of various technologies described herein, and.

DETAILED DESCRIPTION

Figure 1A:
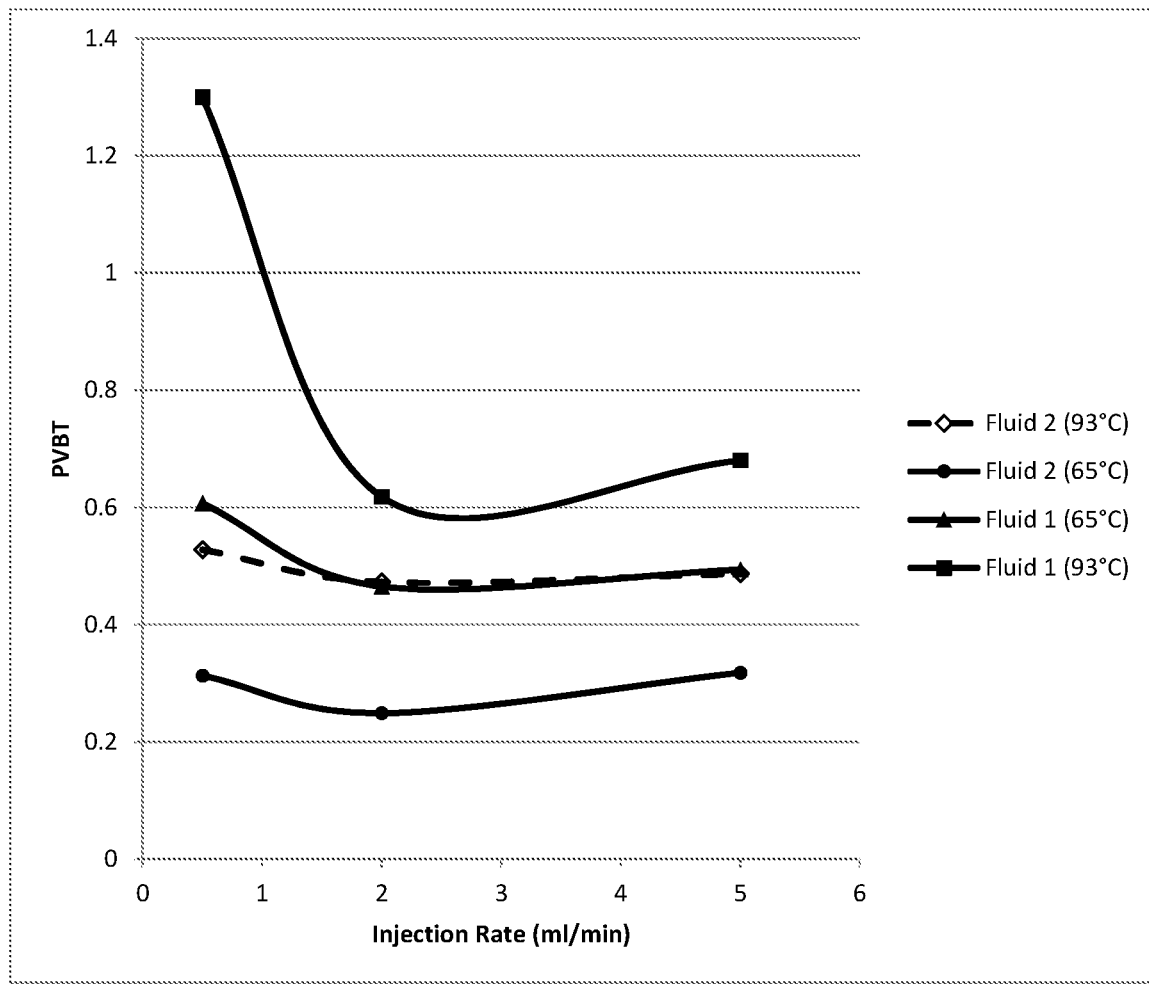
FIG. 1A shows pore volumes to break through versus injection rate for aqueous acid solutions based upon tests performed at various temperatures, according to the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The terms "formation" or "subterranean formation" as utilized herein should be understood broadly, and are used interchangeably. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

Retarded acidizing fluids described below and useful in accordance with the disclosure exhibit a retarded acid reactivity that facilitates greater depth of fracture and/or matrix acidizing. The retarded acidizing fluid can comprise, consist essentially of, or consist of: water; an acid; and a water-soluble acid retarding agent. The following US and PCT Patent Applications disclose various compositions useful as retarded acidizing fluids, and methods of their use, and each are incorporated by reference herein in their entireties: U.S. patent application Ser. No. 15/090,747, filed on Apr. 5, 2016, and titled "Aqueous retarded acid solution and methods for use thereof", and which claims the benefit of U.S. Provisional Application Ser. No. 62/145,945 filed Apr. 10, 2015; PCT Patent Application Number PCT/US2016/049335, filed on Aug. 30, 2016, and titled "EMULSIONS CONTAINING WATER-SOLUBLE ACID RETARDING AGENTS AND METHODS OF MAKING AND USING", and which claims the benefit of U.S. Provisional Application Ser. No. 62/213, 986 filed Sep. 3, 2015; PCT Patent Application Number PCT/US2016/049553, filed on Aug. 31, 2016, and titled "Diversion Acid Containing A Water-Soluble Retarding Agent And Methods Of Making And Using", and which claims the benefit of U.S. Provisional Application Ser. No. 62/214,047 filed Sep. 3, 2015; and PCT Patent Application Number PCT/US2016/049538, filed Aug. 31, 2016, and titled "ON THE FLY MIXING OF ACIDS AND DIVERSION FLUIDS WITH WATER-SOLUBLE RETARDING AGENTS", which claims the benefit of U.S. Provisional Application Ser. No. 62/214,055 filed Sep. 3, 2015.

The retarded acidizing fluid can further comprise a surfactant. The surfactant can be a viscoelastic surfactant (VES). The acid can be selected from the group consisting of hydrochloric acid (HCl), nitric acid, phosphoric acid, sulfuric acid, hydrofluoric acid, hydrobromic acid, perchloric acid, hydrogen iodide, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, or their derivatives, and mixtures thereof. Generally, an acid is transported to a wellsite. According to some embodiments, the acid can be present in the retarded acidizing fluids in an amount up to about 36 wt %, or from about 7.5 to about 36 wt %, or from about 7.5 to about 28 wt %, or from about 7.5 to about 20 wt %, based on the total weight of the retarded acidizing fluid. In some other embodiments, acid can be present in the retarded acidizing fluids in an amount of at least about 37 wt %.

In some embodiments, an acid that has shown particular utility in the retarded acidizing fluid according to the disclosure is hydrochloric acid. In some other embodiments, the retarded acidizing fluid may include an amount of hydrofluoric acid (HF). HF exhibits distinct reactions from HCl, and is useful in certain applications to enhance the activity of the resulting aqueous solution. For example, HF is utilized in the cleanup of sandstone formations where HCl alone is not effective for removing certain types of formation damage. It is believed that the present retarded acidizing fluid will have effects with HF similarly to the observed effects with HCl. Accordingly, solutions can be formulated with a total acid amount that is much higher than presently attainable formulations. In yet another embodiment, the HF is present in the retarded acidizing fluid in an amount of at least 0.25% by weight. The HF may be present in addition to the amount of HCl, and/or as a substitution for an amount of the HCl.

Another component of the retarded acidizing fluid useful according to this disclosure are water-soluble acid retarding agents (RA), which have utility in retarding the rate at which the acid solution reacts with carbonate-mineral, or other surfaces inside the formation. Thus, a water-soluble acid retarding agent may slow the reactivity of the acid towards the carbonate-mineral surfaces, without compromising its acid capacity. Such retardation is useful in the context of stimulating or improving production from subterranean formations that contain hydrocarbons, steam, geothermal brines and other valuable materials as known in the art. Slowing the rate of reaction may allow deeper penetration of the acid into the subterranean formations than regular acid, thereby increasing the formation permeability and productivity. Water-soluble acid retarding agents, as used herein, includes any material that reduces acid activity through a mechanism other than mere dilution. The water-soluble acid retarding agent can comprise a component selected from the group consisting of a salt, urea or one if its derivatives, an alpha-amino acid, a beta-amino acid, a gamma-amino acid, an alcohol with one to five carbons, a surfactant having a structure in accordance with Formula I or Formula II below, and combinations thereof.

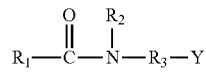

Formula I in which $R_1$ is a hydrocarbyl group that may be branched or straight chained, aromatic, aliphatic or olefinic and contains from about 1 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. As an example of this embodiment the zwitterionic surfactant has the betaine structure:

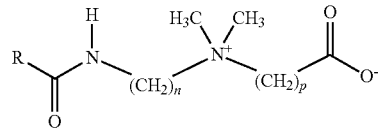

Formula II in which R is a hydrocarbyl group that may be branched or straight chained, aromatic, aliphatic, or olefinic and has from about 1 to about 26 carbon atoms and may contain an amine; n=about 2 to about 4; and p=1 to about 5.

The salt can comprise: i) a cation selected from the group consisting of lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and combinations thereof; and ii) an anion selected from the group consisting of fluoride, chloride, bromide, iodide, sulfate, bisulfate, sulfite, bisulfite nitrate, alkanesulfonates, arylsulfonates, acetate, formate, and combinations thereof. According to the present embodiments, the retarding agent can be added to the retarded acidizing fluid in an amount up to its solubility limit in the retarded acidizing fluid. According to some embodiments, the water-soluble acid retarding agent can be present in the retarded acidizing fluid (s) in an amount of up to about 40 wt %, or from about 1 to about 40 wt %, or from about 5 to about 35 wt %, or from about 5 to about 20 wt %, based on the total weight of the retarded acidizing fluid.

In some embodiments, the retarded acidizing fluid may include HCl as the acid in a weight fraction exceeding 37%. The retarding agent present in some retarded acidizing fluids useful in accordance with the disclosure allows the HCl fraction to exceed the 37% normally understood to be the limit of HCl solubility at atmospheric pressure. Such retarding agents include at least one salt compound and urea, or urea derivative. Above 37%, normally, the evolution of HCl gas from the solution prevents the HCl fraction from getting any higher. In one or more embodiments, the HCl weight fraction of the retarded acidizing fluid may be as high as 45.7 wt %.

Without being bound by any particular theory, inventors envisage mechanisms that inhibit acid activity. The first involves the disruption of the hydrogen-bonded network of water. In the Grotthuss proton-hopping mechanism, protons move in water not through Brownian motion, but rather charge transport through shifting hydrogen bonds. Solutes are known to disrupt the Grotthuss mechanism by interacting with water themselves, rather than allowing protons to associate freely. This slows the proton transport to the wormhole wall during a matrix acidizing treatment. The introduction of salt solutes also has a similar second effect by simply replacing water. The lack of water molecules crowds the fluid and limits the diffusion of protons. The amount of RA present in the retarded acidizing fluid can be any concentration necessary to provide sufficient acid retardation function.

A second mechanism involves the dissociation of acids in solution. As mentioned, organic acids have higher $pK_a$'s than HCl, making the protons from these acids less available for reaction. In some aspects of the disclosure, compounds that lower the polarizability (as indicated by the dielectric constant) of water are used, which therefore decrease the proton dissociation of acids. It is believed that aqueous solutes can modify the activity of acids in water in one or both of these mechanisms.

A parameter that quantifies the retardation of the acid is the retardation factor. As described herein, the retardation factor indicates the ratio of apparent surface reaction rates. According to the present embodiments, the retardation factor of the retarded acidizing fluid is higher or equal to a retardation factor of a second solution of acid of a same concentration as the acid comprised in the retarded acidizing fluid without the retarding agent. For example, in various embodiments, the retarded acidizing fluid may exhibit an acid retardation factor higher than or equal to about 3, at least about 5, or at least about 11 at about 20° C. At about 94° C., the retarded acidizing fluid may exhibit an acid retardation factor higher than or equal to about 3, higher than or equal to about 5, or even higher than or equal to about 7.

Water is present in the retarded acidizing fluid in an amount sufficient to dissolve the acid and the retarding agent. According to embodiments according to the disclosure, the water concentration included in the retarded acidizing fluid can be greater than 0 wt % and lower or equal to 80 wt %. In various embodiments, the water concentration can be lower than 60 wt %, or lower than 40 wt % or lower than 20 wt %, and equal to or higher than 8 wt %, or equal to or higher than 10 wt %. In yet other embodiments, the water concentration can even be lower than 8 wt %.

According to some embodiments, an amount of water is mixed with a retarding agent, where the amount of water is present in an amount between 0.3 and 5 times the mass of the RA, where any lower limit can be 0.35, 0.4, or 0.45 and any upper limit can be 1.0, 1.2, 1.25, where any lower limit can be combined with any upper limit. The procedure further includes dissolving an amount of acid into the combined amount of water and RA. The acid, such as HCl, may be added by any method, such as bubbling HCl gas through the solution. The dissolving of the HCl may occur after dissolving of the RA, simultaneous with the dissolving of the RA, or at least partially before the dissolving of the RA. The amount of HCl gas is in a molar ratio of between 4.0 and 0.5 times the amount of the RA. In yet another embodiment, the procedure includes dissolution of at least a portion of the RA in the water during the dissolution of the HCl in the combined water and RA. Example operations include beginning the dissolution of the HCl and adding the RA as a solid or a solution, providing some of the RA in solution with the water and some of the RA as a solid, and/or providing the RA as a solid in the water and dissolving the HCl into the water while dissolving the RA.

Viscoelastic surfactants (VES) create aqueous gels that are employed as oil well treatments for hydraulic fracturing, sand migration control and diversion. U.S. Pat. No. 7,237,608, Fu et al., SELF DIVERTING MATRIX ACID filed in the U. S. Patent Office on Oct. 20, 2004, granted Jul. 3, 2007 is incorporated herein by reference in its entirety, and discloses viscoelastic surfactants, among other things, which are useful for the retarded acidizing fluid(s) disclosed herein. The viscoelastic surfactant can comprise a zwitterionic surfactant having a structure in accordance with Formula III or Formula IV below.

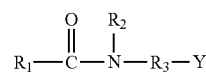

Formula III in which $R_1$ is a hydrocarbyl group that may be branched or straight chained, aromatic, aliphatic or olefinic and contains from about 17 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. As an example of this embodiment, the zwitterionic surfactant has the betaine structure:

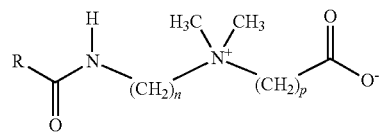

Formula IV in which R is a hydrocarbyl group that may be branched or straight chained, aromatic, aliphatic or olefinic and has from about 17 to about 26 carbon atoms and may contain an amine; n=about 2 to about 4; and p=1 to about 5.

The viscoelastic surfactant can be erucic amidopropyl dimethyl betaine. According to some embodiments, the viscoelastic surfactant is present in the retarded acidizing fluid(s) in an amount of up to about 6% v/v or from about 0.02 to about 6% v/v, or from about 0.04 to about 4% v/v, or from about 0.2 to about 3% v/v, based on the total volume of the retarded acidizing fluid.

The retarded acidizing fluid can be in the form of a gel. The retarded acidizing fluid can have a lower viscosity at a pH below about 0 as compared to a viscosity of an equivalent retarded acidizing fluid which does not contain the water-soluble acid retarding agent. The retarded acidizing fluid can have a viscosity, at temperatures between about 20° C. to about 150° C. or about 20° C. to about 94° C. and a pH above about 3, which is higher than the viscosity of an equivalent retarded acidizing fluid which does not contain the water-soluble acid retarding agent.

Further, it is also within the scope of the present disclosure that the retarded acidizing fluids may be combined with one or more other additives known to those of skill in the art, such as, but not limited to, corrosion inhibitors, scale inhibitors, demulsifiers, foaming agents, hydrogen sulfide scavengers, reducing agents and/or chelants, and the like. For example, non-surface active substituted ammonium containing amino acid derivatives may be used as environmentally friendly corrosion inhibitors that effectively protect various tools employed in oilfield operations by surface treating these tools.

The corrosion inhibitor is typically provided in liquid form and is mixed with the other components of the treatment fluid at the surface and then introduced into the formation. The corrosion inhibitor system is present in the treatment fluid in an amount of from about 0.2% to about 3% by total weight of the treatment fluid. The corrosion inhibitor used with the fluids of the present disclosure includes an alkyl, alkenyl, alycyclic or aromatic substituted aliphatic ketone, which includes alkenyl phenones, or an aliphatic or aromatic aldehyde, which includes alpha, or beta-unsaturated aldehydes, or a combination of these. Alkyl, alycyclic or aromatic phenone and aromatic aldehyde compounds may also be used in certain applications. Other unsaturated ketones or unsaturated aldehydes may also be used. Alkynol phenone, aromatic and acetylenic alcohols and quaternary ammonia compounds, and mixtures of these may be used, as well. These may be dispersed in a suitable solvent, such as an alcohol, and may further include a dispersing agent and other additives.

Chelating agents are materials that are employed, among other uses, to control undesirable reactions of metal ions. In oilfield chemical treatments, chelating agents are frequently added to matrix stimulation acids to prevent precipitation of solids (metal control) as the acids spend on the formation being treated. These precipitates include iron hydroxide and iron sulfide. In addition, chelating agents are used as components in many scale removal/prevention formulations. Two different types of chelating agents may be used: polycarboxylic acids (including aminocarboxylic acids and polyaminopolycarboxylic acids) and phosphonates. The non-surface active substituted ammonium containing aminoacid derivatives may act as chelating agents when present in the treatment fluid in amount of from about 0.05% to about 10% or from about 1 wt % to about 5 wt %, based upon total weight percent of the fluid.

Diversion fluids are described below and useful in accordance with the disclosure. Diversion fluids can comprise, consist of, or consist essentially of water, a VES as described herein, an acid as described herein, and an RA, also as described herein.

According to some embodiments, the VES can be present in the diversion fluid(s) in an amount of up to about 6% v/v, or from about 0.02 to about 6% v/v, or from about 0.04 to about 4% v/v, or from about 0.2 to about 3% v/v, based on the total volume of the diversion fluid. According to some embodiments, the RA can be present in the diversion fluid(s) in an amount of up to about 40 wt %, or from about 1 to about 40 wt %, or from about 5 to about 35 wt %, or from about 5 to about 20 wt %, based on the total weight of the diversion fluid.

Water is present in the diversion fluid(s) in an amount sufficient to dissolve the VES and the RA. According to embodiments according to the disclosure, the water concentration included in the diversion fluid can be greater than 0 wt % and lower or equal to 80 wt %. In various embodiments, the water concentration can be lower than 60 wt %, or lower than 40 wt % or lower than 20 wt %, and equal to or higher than 8 wt %, or equal to or higher than 10 wt %. In yet other embodiments, the water concentration can even be lower than 8 wt %.

In accordance with some embodiments, a method of treating a subterranean formation penetrated by a wellbore can comprise, consist of, or consist essentially of: a. measuring at least one parameter of the subterranean formation resulting in at least one parameter value; b. forming the retarded acidizing fluid comprising the acid, and the acid retarding agent (RA) comprising at least one salt compound, as described herein, by adjusting the concentrations of the acid and RA based on the at least one parameter value; and c. contacting the subterranean formation with the retarded acidizing fluid at a pressure less than the fracture initiation pressure of the subterranean formation to treat the subterranean formation. When a surfactant is present in the retarded acidizing fluid. as described herein, the concentration of the surfactant can also be adjusted based on the at least one parameter value.

A desired acid reactivity for the retarded acidizing fluid can be determined based on the value of the at least one parameter; and the concentrations of the acid and RA, and optionally of the surfactant, if present, can be adjusted in order to provide the desired acid reactivity. The at least one parameter can be selected from the group consisting of temperature, pressure, calcite concentration, dolomite concentration, Mg concentration, formation fluid viscosity, formation capillary pressure, and combinations thereof. At least two of the parameters can be measured and the concentrations of the acid and RA, and optionally of the surfactant, if present, can be adjusted based on the resulting at least two parameter values.

The subterranean formation can comprise at least two or at least 3 or at least 4 sections, and the at least one parameter can be measured for at least one of the sections. The at least one parameter can be measured for each of the at least two sections, and the composition is adjusted for each of the at least two sections by adjusting the concentrations of the acid and RA, and optionally of the surfactant, if present, based on the at least one parameter value for each of the at least two sections.

The at least one parameter can also be measured at one or more points in time during the contacting of the retarded acidizing fluid with the subterranean formation resulting in at least one dynamic parameter value, and the concentrations of the acid and RA, and optionally of the surfactant, if present, of the retarded acidizing fluid can then be adjusted based on the at least one dynamic parameter value in order to provide the desired acid reactivity.

The retarded acidizing fluid can be formed by combining an acid-containing composition with a RA-containing composition within the subterranean formation. The RA-containing composition can further comprise the surfactant, as described herein. An advantage of mixing downhole is that the level of acid retardation can be modulated very rapidly, in response to the location of a delivery system, such as coiled tubing, within the wellbore or a downhole monitoring system that might indicate the quality of the acid stimulation within a particular zone, or the presence of an adverse response, such as local caving, or the presence of increased dolomite content. Downhole mixing may therefore be particularly advantageous when a high degree of heterogeneity is present in the subterranean formation. Either or both of the acid-containing and RA-containing compositions can be introduced to the subterranean formation prior to combination by a coiled tubing system.

In accordance with an embodiment, the RA-containing composition can be introduced to the subterranean formation between separate introductions of the acid-containing composition into the subterranean formation, and the acid-containing composition can be combined with the RA-containing composition to form a first stage composition within the subterranean formation. The spacing between the RA-containing composition and the acid-containing composition introductions (or pads) can be very variable, and indeed may be sufficiently short that effective mixing can occur in the transit between the surface and the formation without the need to induce additional pressure drop from a separate mixing unit, for example where variable displacement pumps are used to meter and control the fluid delivery from each tank containing the components.

The introductions of the RA-containing and acid-containing compositions can be repeated at least n times to form subsequent (n+1)th stage compositions, and wherein n=1 through 10 or 1 through 8 or 1 through 6. The subterranean formation can comprise first through nth number of sections, corresponding to the first through nth stage compositions. The at least one parameter value can be measured for each of the first through nth sections, desired acid reactivities can then be determined for the first through nth stage compositions based on the at least one parameter values measured for each of the first through nth sections; and the concentrations of the acid and RA can be adjusted for each of the first through nth stage compositions in order to provide the desired acid reactivities.

In accordance with an embodiment, a method of treating a subterranean formation penetrated by a wellbore can comprise, consist of, or consist essentially of: introducing a first composition comprising the RA as described herein to the subterranean formation at a pressure less than the fracture initiation pressure of the subterranean formation; and following introduction of the first composition, introducing a second composition comprising acid, as described herein, to the subterranean formation at a pressure less than the fracture initiation pressure of the subterranean formation to treat the formation. The first composition can further comprise the surfactant, as described herein. Either or both of the first and second compositions can be introduced to the subterranean formation by a coiled tubing. The subterranean formation can comprise at least two sections, and the first and second compositions can each be separately contacted with at least one of the sections. Introduction of the first composition comprising the RA into the subterranean formation prior to introduction of the second composition comprising acid can remove or reduce the need to pre-mix the retarded acidizing fluid into a controlled recipe, allowing an easier and lower cost implementation of an adequate, though maybe not ideally optimized, approach to optimizing the level of retardation. It also allows an effective dose of RA to be delivered into the pore spaces of the subterranean formation around the wellbore, that would mix in-situ to produce the retarded acidizing fluid. Also, the additives within the preparatory RA-containing fluids no longer need to be compatible with HCl at high concentrations and temperatures, hence can instead be optimized for a range of different functions at lower cost—such as including surfactants for near wellbore cleanup. This can include spacers of leakoff control material, such as fibres, sand, or gel.

In accordance with an embodiment, a method of treating (acid fracturing) a subterranean formation penetrated by a wellbore comprises, consists of, or consists essentially of: a. utilizing a retarded acidizing fluid comprising an acid, and RA, as described herein; b. contacting the formation with the retarded acidizing fluid over a period of time at a pressure higher than the fracture initiation pressure of the subterranean formation to fracture and treat the formation; and c. reducing the concentration of the RA relative to the acid in the retarded acidizing fluid during the period of time from an initial RA concentration to a final RA concentration lower than the initial RA concentration. The final RA concentration can be at least about 20 or about 30 or about 50% lower than the initial RA concentration. The retarded acidizing fluid can further comprise the surfactant, as described herein, and the concentration of the surfactant can also be reduced relative to the acid in the retarded acidizing fluid during the period of time from an initial surfactant concentration to a final surfactant concentration lower than the initial surfactant concentration.

The etching process of this acid fracturing method can be enhanced by the above described modulation of the level of retardation in the retarded acidizing fluid. Often, in the front face of the fracture a very high level of retardation is optimum, as this can help to ensure the acid reaches deep into the fracture before spending. If the level of retardation is too low then it spends early in the fracture, and the fracture is advanced with a substantial volume of unreactive fluid. This results in unproductive fracture length, wasted fluid and time on location as this un-etched fracture face closes after the fluid pressure is withdrawn, and will not contribute greatly to the eventual production.

The at least one parameter of the subterranean formation can be measured resulting in at least one parameter value, at least one desired acid reactivity for the retarded acidizing fluid can be determined based on the value of the at least one parameter; and the reduction of the concentration of the RA, or of the surfactant if present, relative to the acid in the retarded acidizing fluid during the period of time is based on the at least one desired acid reactivity. In accordance with an embodiment, at least two of the parameters can be measured. The at least one or at least two parameters can be measured at one or more points in time during the contacting of the retarded acidizing fluid with the subterranean formation resulting in at least one or at least two dynamic parameter values, and the concentrations of the acid and RA, and of the surfactant if present, of the retarded acidizing fluid can be adjusted based on the at least one or at least two dynamic parameter values in real time in order to provide the desired acid reactivity.

In accordance with some embodiments, the retarded acidizing fluid is formed by combining an acid-containing composition, as described herein, with a RA-containing composition, as described herein, within the subterranean formation. Either or both of the acid-containing and RA-containing compositions can be introduced to the subterranean formation prior to combination by a coiled tubing.

Some embodiments according to present disclosure, as described herein, are methods for treating a formation penetrated by a wellbore. The methods can involve separately mixing, at the wellsite, or within the subterranean formation, the components of acidizing fluids, the retarded acidizing fluid and the diversion fluid. In accordance with the embodiments described herein, the concentrations of the acid and RA ("desired concentrations"), and the surfactant if present, and the desired acid reactivities, of the retarded acidizing fluids are determined from and based on the at least one parameter values. Further, the resulting retarded acidizing fluids can be analyzed for components or properties, using analytical techniques such as densitometry, electrochemical, thermal, nuclear, microrheology, or other optical means. The measured values can then be compared to the desired concentrations and/or the desired acid reactivities, with feedback control (either open or closed loop) to control such acid and RA concentrations in the preparation of the retarded acidizing fluids.

The following examples are presented to further illustrate the preparation and properties of the wellbore fluids of the present disclosure and should not be construed to limit the scope of the disclosure, unless otherwise expressly indicated in the appended claims.

EXAMPLES

Example 1—Wellbore Temperature and Pressure

Figure 1B:
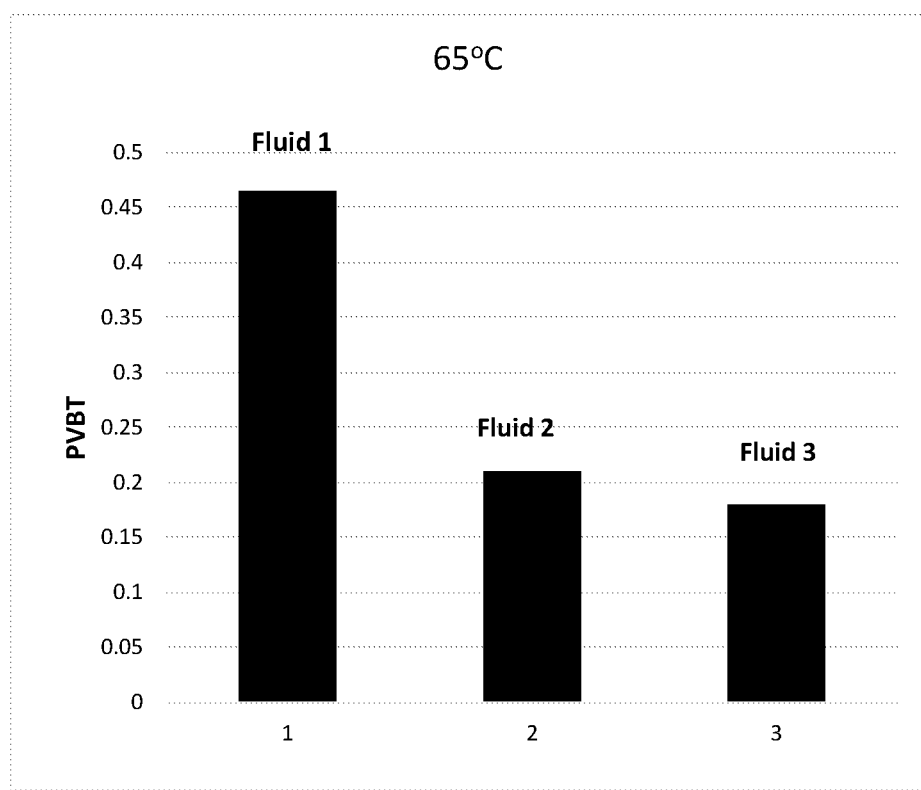
FIG. 1B shows pore volumes to break through versus injection rate for aqueous acid solutions based upon tests performed at 65° C., according to the disclosure.
Figure 1C:
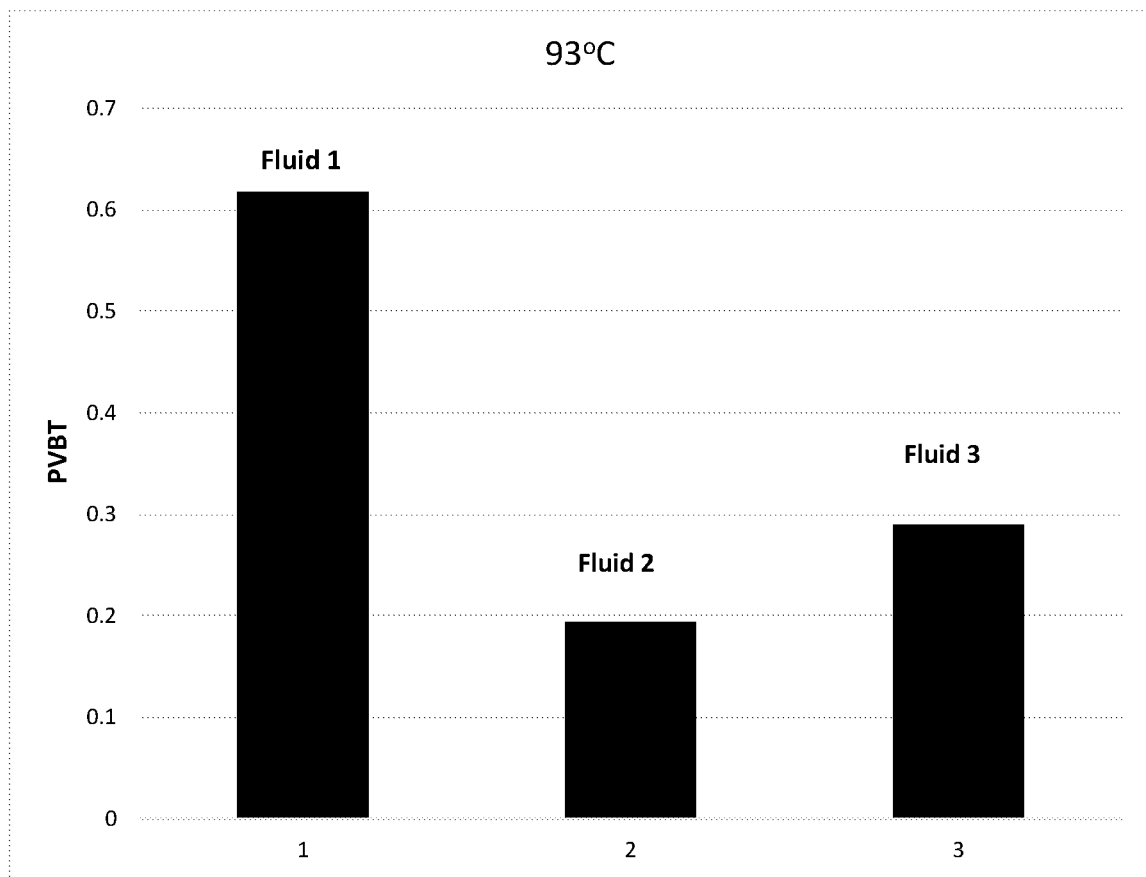
FIG. 1C shows pore volumes to break through versus injection rate for aqueous acid solutions based upon tests performed at 93° C., according to the disclosure.
Figure 1D:
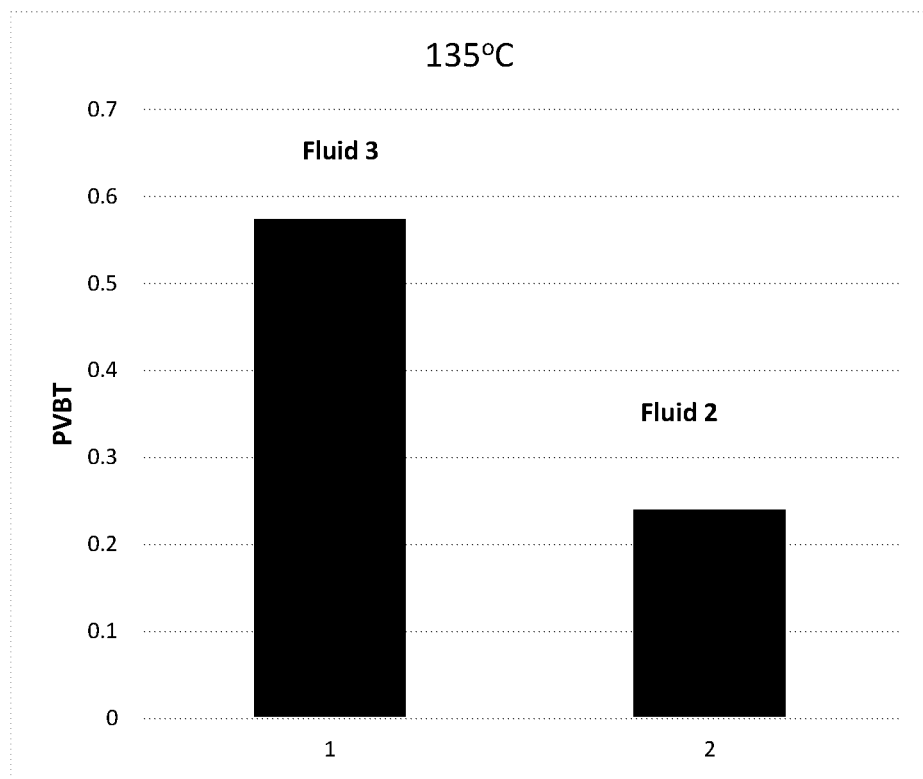
FIG. 1D shows pore volumes to break through versus injection rate for aqueous acid solutions based upon tests performed at 135° C., according to the disclosure.

The temperature of the wellbore interval is one of the key factors in the reactivity of the acid system, yet is typically only addressed in a binary fashion from a selection of fluids with fixed retardation properties. Temperature can significantly impact the rate of dissolution between acid and formation of the wellbore. An example of this is illustrated in FIGS. 1A, 1B, 1C, and 1D, where PVBT for three different fluids, described below, are shown at different temperatures, highlighting the significant variation of PVBT as a function of temperature change. FIGS. 1B and 1C show that the optimum PVBT fluid does not necessarily correspond to the most retarded acid for temperatures of 65° C. and 93° C.

Fluid 1: 15 wt % HCl, and the balance water;
Fluid 2: 15 wt % HCl, 8 wt % $MgCl_2$, 1 wt % surfactant (erucic amidopropyl dimethyl betaine) and the balance water;
Fluid 3: 15 wt % HCl, 4 wt % $MgCl_2$, 1 wt % surfactant (erucic amidopropyl dimethyl betaine) and the balance water.

Figure 2:
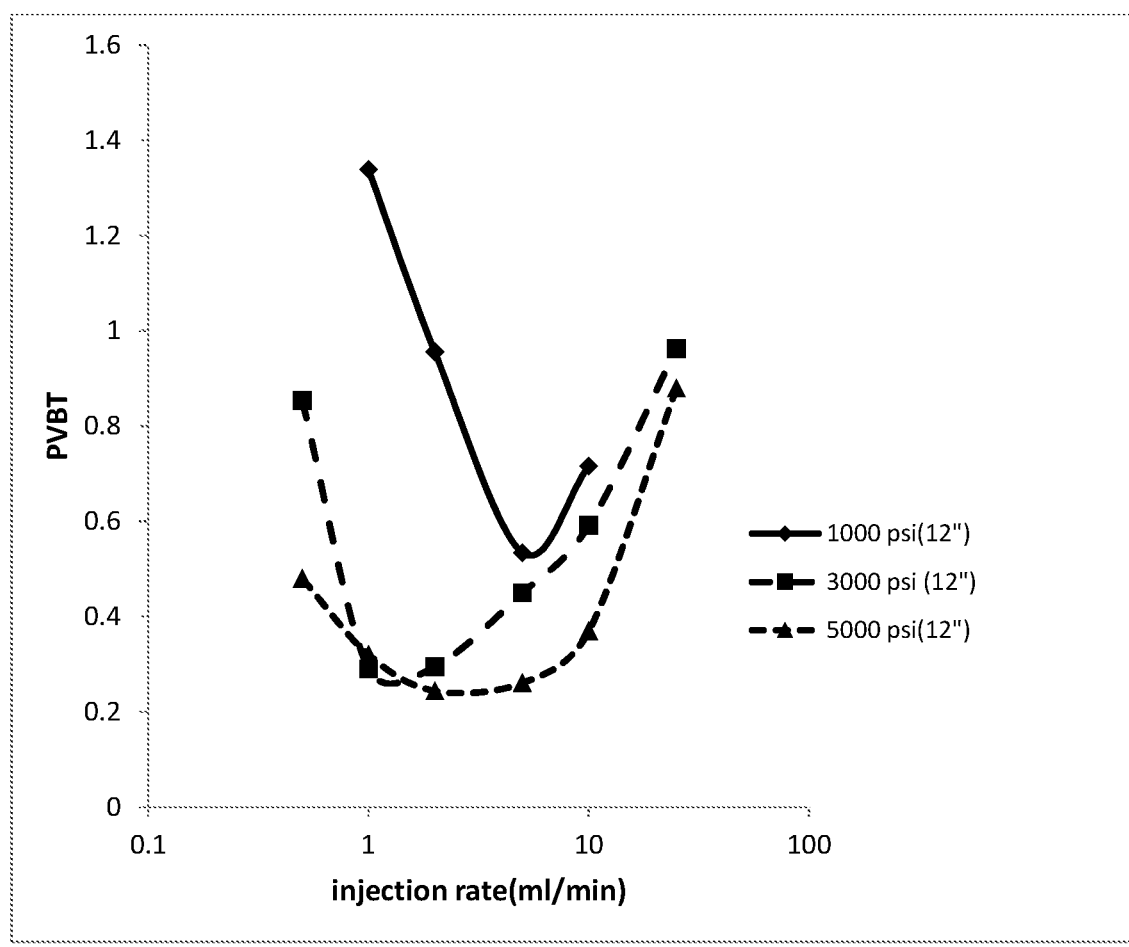
FIG. 2 shows pore volumes to break through versus injection rate for aqueous acid solutions based upon tests performed at various pressures, according to the disclosure.

The impact of pressure is shown in FIG. 2, wherein Fluid 2 was tested at various pressures, all at a fixed temperature of 65° C. FIGS. 1A-1D and FIG. 2 show that being able to tailor the composition of the stimulation fluid to match reservoir conditions (temperature and pressure) can be seen to confer significant performance advantages.

Example 2—Reservoir Mineralogy and Permeability

Figure 3:
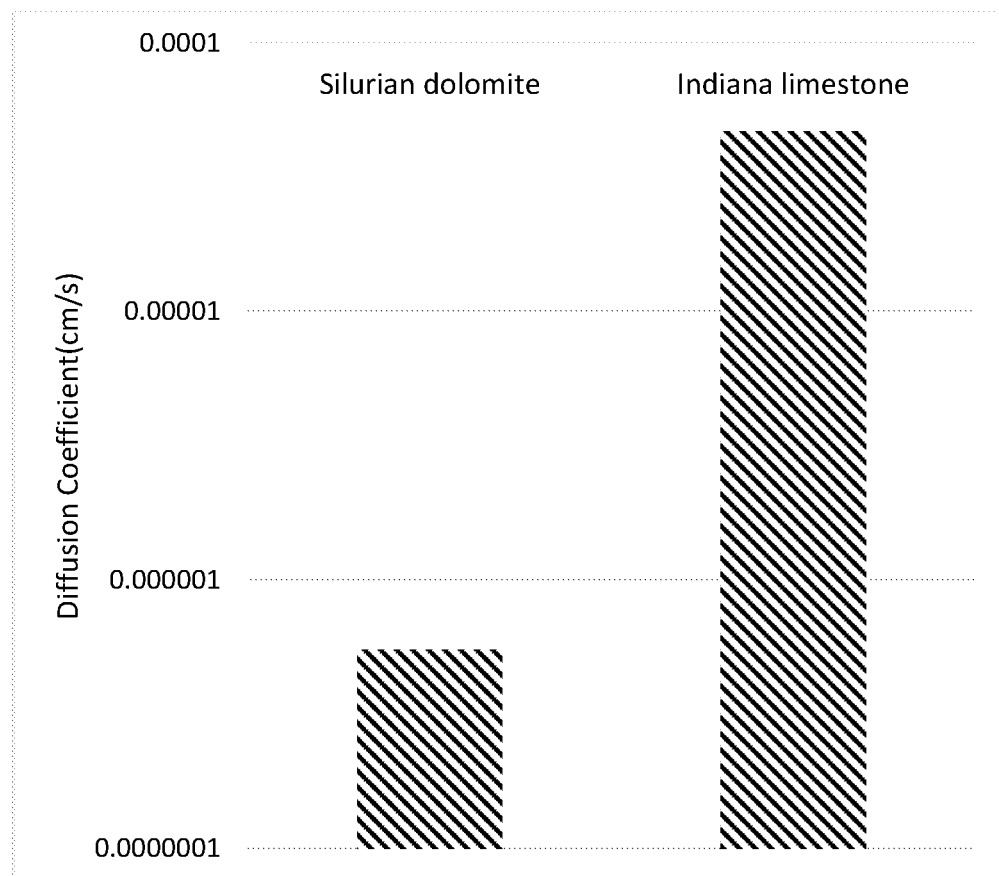
FIG. 3 shows diffusion constants (reaction rate) between Silurian dolomite and 15% HCl and between Indiana limestone and 15% HCl at the same conditions (T, P), according to the disclosure.

Similarly for mineralogy, where there exists a sliding scale between pure calcite and pure dolomite, tailored chemistry is required to ensure the correct level of retardation in the stimulation fluid to optimize performance/cost/benefit ratio of the treatment. The reaction rate between Silurian dolomite and 15% HCl is 1% of the reaction rate between Indiana limestone and 15% HCl at the same conditions (T=65° C., P=3000 psi), as shown in FIG. 3. The data in FIG. 3 was obtained from rotating disk experiments. Therefore, it is clear that it is desirable to optimize the reactivity of the fluid, and even adjust the reactivity on the fly, based on the exact mineralogy for different sections of the reservoir within a subterranean formation.

Example 3—$MgCl_2$ Concentration

Figure 4:
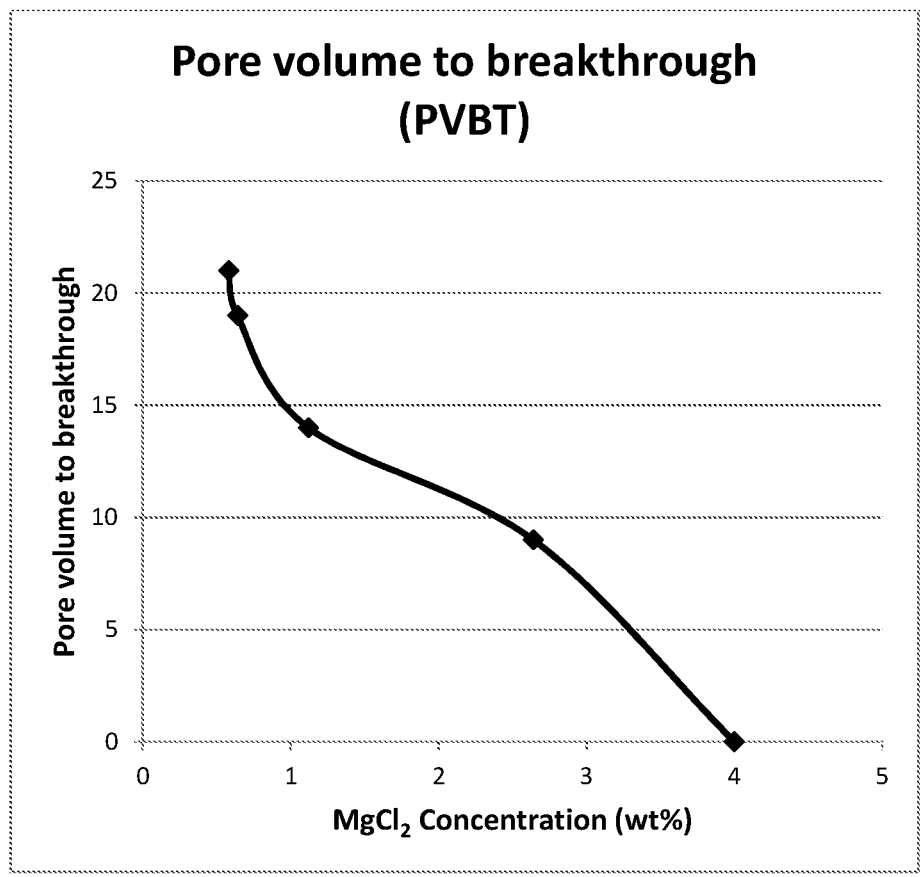
FIG. 4 shows pore volumes to break through for aqueous fluids containing 15 wt % HCl versus $MgCl_2$ concentration based upon tests performed at various $MgCl_2$ concentrations, according to the disclosure.

FIG. 4 shows the results from PVBT experiments wherein $MgCl_2$ concentrations were varied for aqueous fluids containing 15 wt % HCl. FIG. 4 shows that varying the concentration of $MgCl_2$ can control pore volume breakthrough, which can be used to optimize injection rates and acid reactivity.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A method of treating a subterranean formation penetrated by a wellbore, the method comprising:
measuring at least one parameter of the subterranean formation, resulting in at least one parameter value, wherein the at least one parameter comprises temperature of the subterranean formation, or pressure of the subterranean formation, or both;
forming a retarded acidizing fluid comprising an acid and an acid retarding agent (RA) comprising a salt compound, by adjusting a first concentration of the acid and a second concentration of the RA based on the at least one parameter value;
contacting the subterranean formation with the retarded acidizing fluid at a pressure less than the fracture initiation pressure of the subterranean formation to treat the subterranean formation;

measuring the at least one parameter of the subterranean formation while the retarded acidizing fluid is in contact with the subterranean formation, resulting in at least one dynamic parameter value; and dynamically adjusting the first concentration of the acid, the second concentration of the RA, or both, of the retarded acidizing fluid within the subterranean formation based on the at least one dynamic parameter value.

2. The method of claim 1, comprising determining a desired acid reactivity for the retarded acidizing fluid based on the at least one parameter value, wherein forming the retarded acidizing fluid comprises adjusting the first concentration of the acid and the second concentration of the RA in order to provide the desired acid reactivity.

3. The method of claim 2, comprising determining the desired acid reactivity for the retarded acidizing fluid based on the at least one dynamic parameter value, and wherein dynamically adjusting the first concentration of the acid, the second concentration of the RA, or both, comprises dynamically adjusting the first concentration of the acid, the second concentration of the RA, or both, in order to provide the desired acid reactivity.

4. The method of claim 1, wherein the subterranean formation comprises at least two sections, and wherein the at least one parameter is measured for each section of the at least two sections.

5. The method of claim 1, wherein the acid comprises one or more of: hydrogen chloride, hydrogen bromide, hydrogen iodide, hydrogen fluoride, sulfuric acid, nitric acid, phosphoric acid alkanesulfonic acids, arylsulfonic acids, acetic acid, formic acid, alkyl carboxylic acids, acrylic acid, lactic acid, glycolic acid, malonic acid, fumaric acid, citric acid, and tartaric acid.

6. The method of claim 1, wherein the retarded acidizing fluid comprises a surfactant, and wherein the salt compound comprises one or more cations selected from lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium, or tetraalkylammonium, and one or more anions selected from fluoride, chloride, bromide, iodide, sulfate, bisulfate, sulfite, bisulfate nitrate, alkanesulfonates, arylsulfonates, acetate, or formate.

7. The method of claim 1, wherein the fluid is formed by combining an acid-containing composition with a RA-containing composition within the subterranean formation.

8. The method of claim 7, wherein the acid-containing composition, the RA-containing, or both, are introduced to the subterranean formation prior to combination by a coiled tubing system.

9. The method of claim 7, wherein the RA-containing composition is introduced to the subterranean formation between separate introductions of the acid-containing composition into the subterranean formation, and wherein the acid-containing composition is combined with the RA-containing composition to form a first stage composition within the subterranean formation.

10. The method of claim 9, wherein the introduction of the RA-containing composition and the introductions of the acid-containing composition are repeated at least n times to form subsequent (n+1)th stage compositions, and wherein n=1 through 10.

11. The method of claim 10, wherein the subterranean formation comprises a first through nth number of sections, corresponding to the first through nth stage compositions.

12. The method of claim 11, wherein the at least one parameter value is measured for each section of the first through nth sections, wherein respective desired acid reactivities are determined for the first through nth stage compositions based on the at least one parameter values measured for each of the first through nth sections; and wherein the first concentration of the acid and the second concentration of the RA are adjusted for each stage composition of the first through nth stage compositions in order to provide the respective desired acid reactivities.

13. The method of claim 1, wherein the at least one parameter comprises the temperature of the subterranean formation.

14. The method of claim 13, wherein the at least one parameter further comprises calcite concentration, dolomite concentration, magnesium (Mg) concentration, formation fluid viscosity, or formation capillary pressure, or any combination thereof.

15. The method of claim 1, wherein the at least one parameter comprises the pressure of the subterranean formation.

16. The method of claim 15, wherein the at least one parameter further comprises calcite concentration, dolomite concentration, magnesium (Mg) concentration, formation fluid viscosity, or formation capillary pressure, or any combination thereof.

17. The method of claim 1, wherein the at least one parameter comprises the temperature of the subterranean formation and the pressure of the subterranean formation.

18. The method of claim 17, wherein the at least one parameter further comprises calcite concentration, dolomite concentration, magnesium (Mg) concentration, formation fluid viscosity, or formation capillary pressure, or any combination thereof.

19. The method of claim 1, comprising determining a desired acid reactivity for the retarded acidizing fluid based on the at least one dynamic parameter value, and wherein dynamically adjusting the first concentration of the acid, the second concentration of the RA, or both, comprises dynamically adjusting the first concentration of the acid, the second concentration of the RA, or both, in order to provide the desired acid reactivity.

* * * * *